US012784760B2

(12) United States Patent
Yang

(10) Patent No.: US 12,784,760 B2
(45) Date of Patent: Nov. 3, 2026

(54) VOICE PROCESSING METHOD, APPARATUS AND SYSTEM, SMART TERMINAL AND ELECTRONIC DEVICE

(71) Applicant: Beijing Bytedance Network Technology Co., Ltd., Beijing (CN)

(72) Inventor: Zhiye Yang, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 419 days.

(21) Appl. No.: 18/254,568

(22) PCT Filed: Dec. 1, 2021

(86) PCT No.: PCT/CN2021/134864
§ 371 (c)(1),
(2) Date: May 25, 2023

(87) PCT Pub. No.: WO2022/142984
PCT Pub. Date: Jul. 7, 2022

(65) Prior Publication Data

US 2024/0105198 A1 Mar. 28, 2024

(30) Foreign Application Priority Data

Dec. 29, 2020 (CN) ........................ 202011598381.X

(51) Int. Cl.
*G10L 21/0216* (2013.01)
*G10L 15/26* (2006.01)
(Continued)

(52) U.S. Cl.
CPC .......... *G10L 21/0216* (2013.01); *G10L 25/24* (2013.01); *G10L 2021/02082* (2013.01); *G10L 2021/02166* (2013.01)

(58) Field of Classification Search
None
See application file for complete search history.

(56) References Cited

U.S. PATENT DOCUMENTS

| | | | |
|---|---|---|---|
| 8,983,844 | B1 | 3/2015 | Thomas et al. |
| 10,262,674 | B1 | 4/2019 | Wurmfeld |

(Continued)

FOREIGN PATENT DOCUMENTS

| | | | |
|---|---|---|---|
| CN | 108335697 | A | 7/2018 |
| CN | 108597518 | A | 9/2018 |

(Continued)

OTHER PUBLICATIONS

European Patent Office, Communication pursuant to Article 94(3) EPC for European Application No. 21913725.4, mailed Oct. 24, 2024, 9 pages.

(Continued)

*Primary Examiner* — Pierre Louis Desir
*Assistant Examiner* — Kristen Michelle Masters
(74) *Attorney, Agent, or Firm* — Alleman Hall LLP

(57) ABSTRACT

A voice processing method, apparatus and system, a smart terminal, an electronic device and a storage medium. The method includes: obtaining audio information in a conference process; generating a call flow and a recognition flow, respectively, according to the audio information, where the call flow is used for a voice call, and the recognition flow is used for voice recognition; and sending the call flow and the recognition flow respectively. By means of the technical solution of respectively generating the call flow and the recognition flow based on the audio information, determined conference content corresponding to the audio information has more presentation dimensions and is richer, and thus the accuracy of the conference is improved, the intelligence and quality of the conference are improved, and the conference experience of users is further improved.

19 Claims, 6 Drawing Sheets

(51) Int. Cl.

| | |
|---|---|
| ***G10L 15/30*** | (2013.01) |
| ***G10L 19/12*** | (2013.01) |
| ***G10L 21/0208*** | (2013.01) |
| ***G10L 21/0232*** | (2013.01) |
| ***G10L 21/0272*** | (2013.01) |
| ***G10L 25/24*** | (2013.01) |
| ***G10L 25/30*** | (2013.01) |
| ***H04M 3/00*** | (2024.01) |
| ***H04M 3/56*** | (2006.01) |

(56) References Cited

U.S. PATENT DOCUMENTS

| | | | |
|---|---|---|---|
| 10,771,272 | B1 | 9/2020 | Ghanaie-Sichanie et al. |
| 2004/0047461 | A1* | 3/2004 | Weisman .............. H04M 3/567 379/202.01 |
| 2011/0267419 | A1 | 11/2011 | Quinn et al. |
| 2014/0161243 | A1* | 6/2014 | Contreras ............. H04M 3/565 379/202.01 |
| 2016/0156876 | A1 | 6/2016 | Breedvelt-Schouten et al. |
| 2017/0076713 | A1 | 3/2017 | Gildein, II et al. |
| 2020/0265859 | A1* | 8/2020 | LaBosco ............. G10L 21/0232 |
| 2020/0274911 | A1* | 8/2020 | Gargaro .................. G10L 25/60 |
| 2022/0021551 | A1* | 1/2022 | Trim ................... H04L 12/1818 |

FOREIGN PATENT DOCUMENTS

| | | | |
|---|---|---|---|
| CN | 109388701 | A | 2/2019 |
| CN | 109599115 | A | 4/2019 |
| CN | 110246501 | A | 9/2019 |
| CN | 110797043 | A | 2/2020 |
| CN | 111145751 | A | 5/2020 |
| CN | 111739541 | A | 10/2020 |
| CN | 111883123 | A | 11/2020 |
| CN | 112750452 | A | 5/2021 |
| GB | 2581518 | A | 8/2020 |
| WO | 2019212920 | A1 | 11/2019 |

OTHER PUBLICATIONS

China National Intellectual Property Administration, International Search Report and Written Opinion Issued in Application No. PCT/CN2021/134864, Mar. 1, 2022, WIPO, 17 pages.

China National Intellectual Property Administration, Office Action and Search Report Issued in Application No. 202011598381X, Apr. 13, 2023, 9 pages. Submitted with some English translation.

China National Intellectual Property Administration, Office Action Issued in Application No. 202011598381.X, Mar. 14, 2024, 10 pages. (Submitted with Concise Explanation of Relevance).

European Patent Office, Extended European Search Report Issued in Application No. 21913725.4, Feb. 23, 2024, Germany, 6 pages.

* cited by examiner

VOICE PROCESSING METHOD, APPARATUS AND SYSTEM, SMART TERMINAL AND ELECTRONIC DEVICE

CROSS-REFERENCE TO RELATED APPLICATIONS

This application is a national stage of International Application No. PCT/CN2021/134864, filed on Dec. 1, 2021, which claims priority to Chinese Patent application No. 202011598381.X, filed on Dec. 29, 2020. Both of the aforementioned applications are hereby incorporated by reference in their entireties.

TECHNICAL FIELD

Embodiments of the present disclosure relate to the technical fields of computers, voice processing, and network communications, and specifically relate to a voice processing method, apparatus and system, a smart terminal, an electronic device, and a storage medium.

BACKGROUND

Conference refers to using modern means of communication to achieve the purpose of conferencing. The conference may include remote conferences, and remote conferences may mainly include telephone conferences, network conferences, and video conferences.

Currently, a voice processing method applied in a conference scenario includes: a local conference device collects audio information corresponding to a local user, and sends the audio information corresponding to the local user to an opposite conference device; and correspondingly, the opposite conference device collects audio information of an opposite user, and sends the audio information of the opposite user to the local conference device, where the audio information is used for voice call.

However, the traditional voice processing method has at least the following technical problems: implementation of conferencing through audio information used for voice call may result in fewer presentation dimensions of the conference content, and a relatively low degree of richness, thereby resulting in relatively low conference quality.

SUMMARY

Embodiments of the present disclosure provide a voice processing method, apparatus and system, a smart terminal, an electronic device, and a storage medium, to solve the problem of relatively low conference quality in related art.

In a first aspect, an embodiment of the present disclosure provides a voice processing method, including:

collecting audio information in a conference process;

generating a call flow and a recognition flow respectively according to the audio information, where the call flow is used for voice call, and the recognition flow is used for voice recognition; and sending the call flow and the recognition flow.

In a second aspect, an embodiment of the present disclosure provides a smart terminal, where the smart terminal includes a microphone array, a processor, and a communication module;

the microphone array is configured to collect audio information in a conference process;

the processor is configured to generate a call flow and a recognition flow respectively according to the audio information, where the call flow is used for voice call, and the recognition flow is used for voice recognition; and the communication module is configured to send the call flow and the recognition flow.

In a third aspect, an embodiment of the present disclosure provides a voice processing apparatus, where the apparatus includes:

a collecting module, configured to collect audio information in a conference process;

a generating module, configured to generate a call flow and a recognition flow respectively according to the audio information, where the call flow is used for voice call, and the recognition flow is used for voice recognition; and a sending module, configured to send the call flow and the recognition flow.

In a fourth aspect, an embodiment of the present disclosure provides a voice processing system, where the system includes: a first terminal device and the smart terminal according to the above second aspect; or, a first terminal device and the apparatus according to the above third aspect; where, the first terminal device is a terminal device participating in a conference.

In a fifth aspect, an embodiment of the present disclosure provides an electronic device, including: at least one processor and a memory; where the memory stores computer-executable instructions; and the at least one processor executes the computer-executable instructions stored in the memory to cause the at least one processor to execute the voice processing method according to the above first aspect and any possible designs of the first aspect.

In a sixth aspect, an embodiment of the present disclosure provides a computer-readable storage medium, where the computer-readable storage medium stores computer-executable instructions which, when executed by a processor, implement the voice processing method according to the above first aspect and any possible designs of the first aspect.

In a seventh aspect, an embodiment of the present disclosure provides a computer program product, which includes a computer program carried on a non-transient computer-readable medium, and when the computer program is executed by a processor, the voice processing method according to the above first aspect and any possible designs of the first aspect is executed.

In an eighth aspect, an embodiment of the present disclosure provides a computer program, and when the computer program is executed by a processor, the voice processing method according to the above first aspect and any possible designs of the first aspect is executed.

The voice processing method, apparatus and system, the smart terminal, the electronic device, and the storage medium provided by embodiments of the present disclosure include: collecting audio information in a conference process; generating a call flow and a recognition flow, respectively, according to the audio information, where the call flow is used for a voice call, and the recognition flow is used for voice recognition; and sending the call flow and the recognition flow respectively. By means of the technical solution of the technical feature of respectively generating the call flow and the recognition flow based on the audio information, the problems of a relatively single presentation dimension and a relatively low degree of richness of the conference content are avoided, the determined conference content corresponding to the audio information has more presentation dimensions and are richer, and thus the accuracy of the conference is improved, the intelligence and quality of the conference are improved, and the conference experience of users is further improved.

BRIEF DESCRIPTION OF DRAWINGS

In order to illustrate technical solutions in the embodiments of the present disclosure or in the prior art more clearly, the following will briefly introduce the accompanying drawings needed in the description of the embodiments or the prior art. Obviously, the accompanying drawings in the following description are some embodiments of the present disclosure. For those of ordinary skill in the art, other drawings may also be obtained from these drawings without creative efforts.

DESCRIPTION OF EMBODIMENTS

In order to make the object, technical solutions and advantages of the embodiments of the present disclosure clearer, the technical solutions in the embodiments of the present disclosure will be described clearly and completely below with reference to the accompanying drawings in the embodiments of the present disclosure. Obviously, these described embodiments are part of, but not all, embodiments of the present disclosure. Based on the embodiments in the present disclosure, all other embodiments obtained by those of ordinary skill in the art without creative efforts shall fall within the protection scope of the present disclosure.

The voice processing method provided by embodiments of the present disclosure can be applied to an application scenario of a conference, and specifically can be applied to the application scenario of a remote conference, where the remote conference refers to using modern means of communication to achieve the purpose of conferencing across regions, and a remote conference system may include a telephone conference, a network conference, a video conference, etc.

Figure 1:
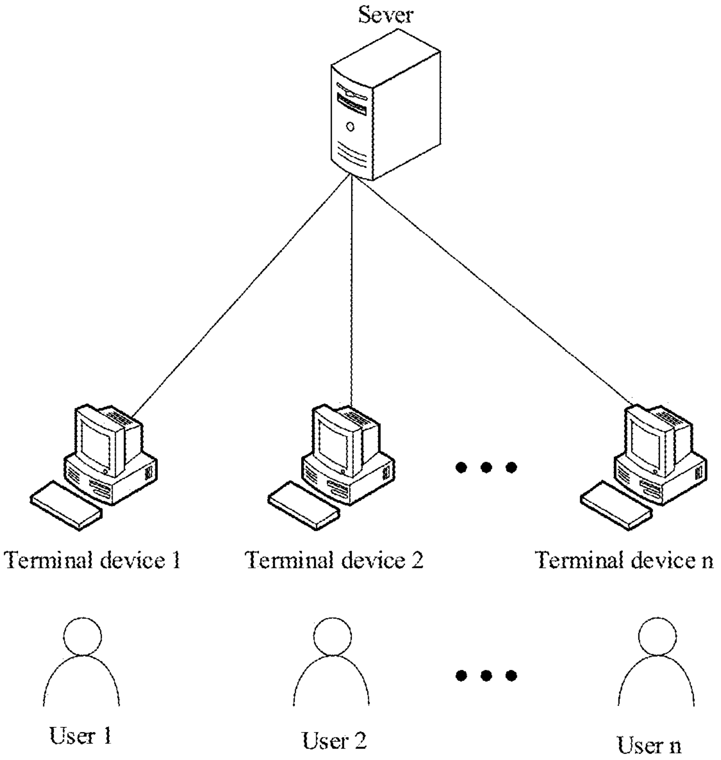
FIG. 1 is a schematic diagram of an application scenario of a voice processing method according to an embodiment of the present disclosure.

FIG. 1 is a schematic diagram of an application scenario of a voice processing method according to an embodiment of the present disclosure.

As shown in FIG. 1, the application scenario may include: a server, at least two terminal devices, and users corresponding to respective terminal devices. FIG. 1 exemplarily shows n terminal devices, that is, the number of participants is n.

Illustratively, the server may establish a communication link with each terminal device, and implement information interaction with each terminal device based on the communication link, so that users corresponding to respective terminal devices can communicate based on a remote conference.

The remote conference includes users from multiple sides, users from one side may correspond to one terminal device, and the number of users from each side may be one or multiple, which is not limited in the present embodiment. For example, a remote conference includes users from multiple sides, and the users from multiple sides are multiple staff members from different enterprises, respectively; for another example, a remote conference includes users from two sides, and the users from two sides are multiple staff members coming from different departments of a same enterprise; for still another example, a remote conference includes users from two sides, and users from one side are multiple staff members of an enterprise, and the user from the other side is an individual user, and the like.

Terminal devices may be mobile terminals, such as mobile phones (or "cellular" phones) and computers with mobile terminals, and for example, may be portable, pocket-sized, hand-held, computer-built, or vehicle-mounted mobile apparatuses, which exchange language and/or data with a wireless access network; the terminal device may also be a smart speaker, a personal communication service (Personal Communication Service, PCS) phone, a cordless phone, a session initiation protocol (Session Initiation Protocol, SIP) phone, a wireless local loop (Wireless Local Loop, WLL) station, a personal digital assistant (Personal Digital Assistant, PDA), a tablet computer, a wireless modem (modem), a handset device (handset), a laptop computer (laptop computer), a machine type communication (Machine Type Communication, MTC) terminal and other devices; the terminal device may also be called as a system, a subscriber unit (Subscriber Unit), a subscriber station (Subscriber Station), a mobile station (Mobile Station), a mobile station (Mobile), a remote station (Remote Station), a remote terminal (Remote Terminal), an access terminal (Access Terminal), a user terminal (User Terminal), a user agent (User Agent), a user device (User Device or User Equipment), etc., which are not limited herein.

It is worth noting that the above examples are only used to exemplify application scenarios to which the voice processing method of the embodiments of the present disclosure may be applicable, and should not be construed as limitations on application scenarios. For example, elements in the application scenario may be adaptively added on the basis of the above example, such as increasing the number of terminal devices; for another example, the elements in the application scenario may be adaptively deleted on the basis of the above example, such as reducing the number of terminal devices, and/or reducing the number of servers, etc.

In the related art, each terminal device can collect audio information of a user corresponding to the each terminal device, and generate a call flow (used for voice call) according to the audio information, and send the call flow to a server based on a communication link between the each terminal device and the server. The server can respectively send, based on other communication links, the call flow to terminal devices corresponding to other communication links, which may also output a call flow, so that users corresponding to other terminal devices can hear the voice and content of the user corresponding to the each terminal device.

However, the transmission of the each terminal device only includes the call flow, resulting in a relatively single display dimension of the conference content and low intelligence in the remote conference.

It should be noted that the above examples are only used to illustrate the applicable application scenarios of the voice processing method in the present embodiment, and should not be construed as a limitation on the application scenarios of the voice processing method in embodiments of the present disclosure. The voice processing method in the present embodiment may also be applied to other conference scenarios (e.g., local conference scenarios); or, to other scenarios where voice processing is needed to be performed on audio information.

The inventor of the present disclosure has obtained the inventive concept of the present disclosure through creative work: generating a call flow and a recognition flow respectively according to the audio information, the call flow being used for voice call, and the recognition flow being used for voice recognition, so as to achieve the diversity of conference content used for the conference and to improve conference experience of users.

Technical solutions of the present disclosure and how the technical solutions of the present disclosure solve the above-mentioned technical problems will be described in detail below with specific embodiments. The following specific embodiments may be combined with each other, and the same or similar concepts or processes may not be repeated in some embodiments. The embodiments of the present disclosure will be described below with reference to the accompanying drawings.

Figure 2:
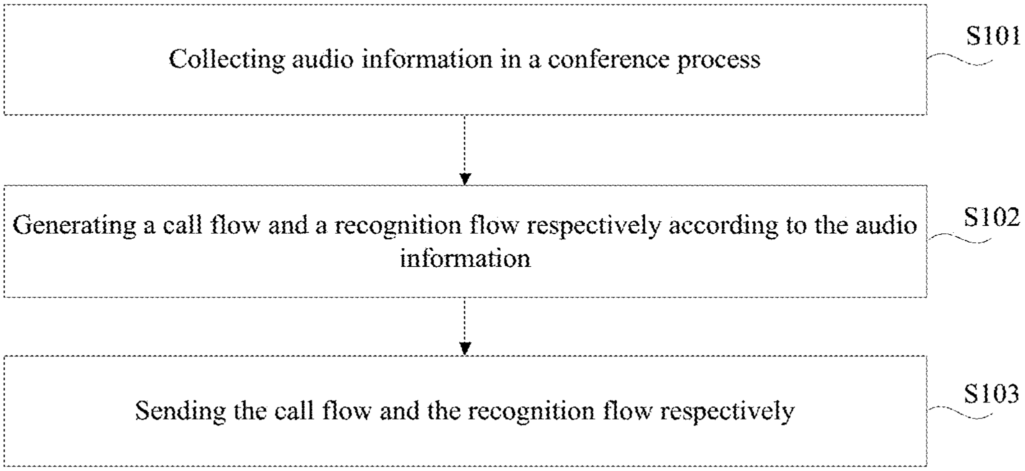
FIG. 2 is a schematic flowchart of a voice processing method according to an embodiment of the present disclosure.

Please Refer to FIG. 2, which is a schematic flowchart of a voice processing method according to an embodiment of the present disclosure.

As shown in FIG. 2, the method includes:

S101, collecting audio information in a conference process.

Illustratively, the execution entity of the present embodiment may be a voice processing apparatus, and the voice processing apparatus may be a terminal device, a server, a processor, a chip, etc., which is not limited in the present embodiment.

For example, when the voice processing method of the present embodiment is applied to the application scenario as shown in FIG. 1, the voice processing apparatus may be a terminal device as shown in FIG. 1, such as at least one from terminal device 1 to terminal device n in FIG. 1.

Correspondingly, taking the terminal device n as an example, when user n delivers a speech, the terminal device n can collect corresponding audio information.

S102, generating a call flow and a recognition flow respectively according to the audio information, where the call flow is used for voice call, and the recognition flow is used for voice recognition.

In the present embodiment, the voice processing apparatus respectively generates a call flow for voice call and a recognition flow for voice recognition based on the audio information collected. With reference to the above example, this step can be understood as: the terminal device n processes the audio information to generate the call flow and the recognition flow respectively.

It is worth noting that the technical solution provided by the present embodiment, which includes the technical feature of generating a call flow and a recognition flow respectively based on audio information, avoids the problem of the related art that the conference content used for the conference is relatively single, which causes the conference content received by users at the opposite end may be inaccurate, that is, the conference content obtained by users is incorrect. The technical solution improves the users' understanding of the conference content, thereby improving the accuracy, intelligence and quality of the conference, and improving the users' conference experience.

S103, sending the call flow and the recognition flow.

With reference to the application scenario as shown in FIG. 1, if the voice processing apparatus is the terminal device n, in a possible technical solution, the terminal device n can send the call flow and the recognition flow to the server respectively, and the server can send the call flow and the recognition flow to the terminal device 1. Correspondingly, the terminal device 1 outputs the call flow, and the user 1 can hear the voice content of the remote conference corresponding to the call flow, that is, the user 1 can hear speech content of the user n; and the terminal device 1 outputs text content corresponding to the recognition flow, that is, the user 1 can see the speech content of the user n.

Based on the above analysis, the present embodiment provides a voice processing method, the method includes: collecting audio information in a conference process; generating a call flow and a recognition flow respectively according to the audio information, where the call flow is used for voice call, and the recognition flow is used for voice recognition; and sending the call flow and the recognition flow. By means of generating both the call flow for voice call and the recognition flow for voice recognition, it is possible to avoid that, in related art, the method of processing audio information to obtain a conference content for characterizing the conference is relatively single, and achieve that the determined conference content corresponding to the audio information is more and richer, thereby improving the accuracy, intelligence and quality of the conference, and also improving the users' conference experience.

Figure 3:
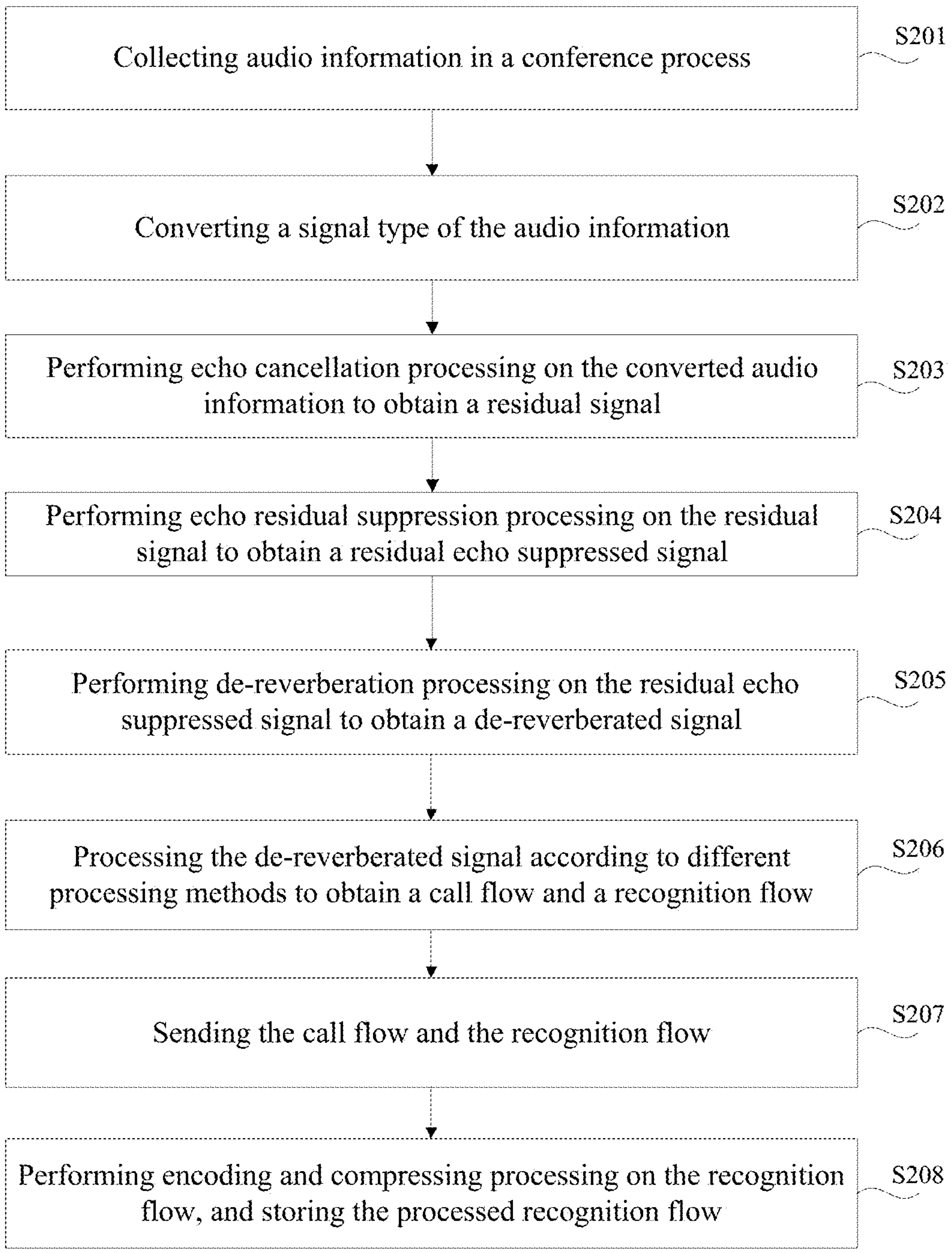
FIG. 3 is a schematic flowchart of a voice processing method according to another embodiment of the present disclosure.

Please refer to FIG. 3, which is a schematic flowchart of a voice processing method according to another embodiment of the present disclosure.

As shown in FIG. 3, the method includes:

S201, collecting audio information in a conference process.

Figure 4:
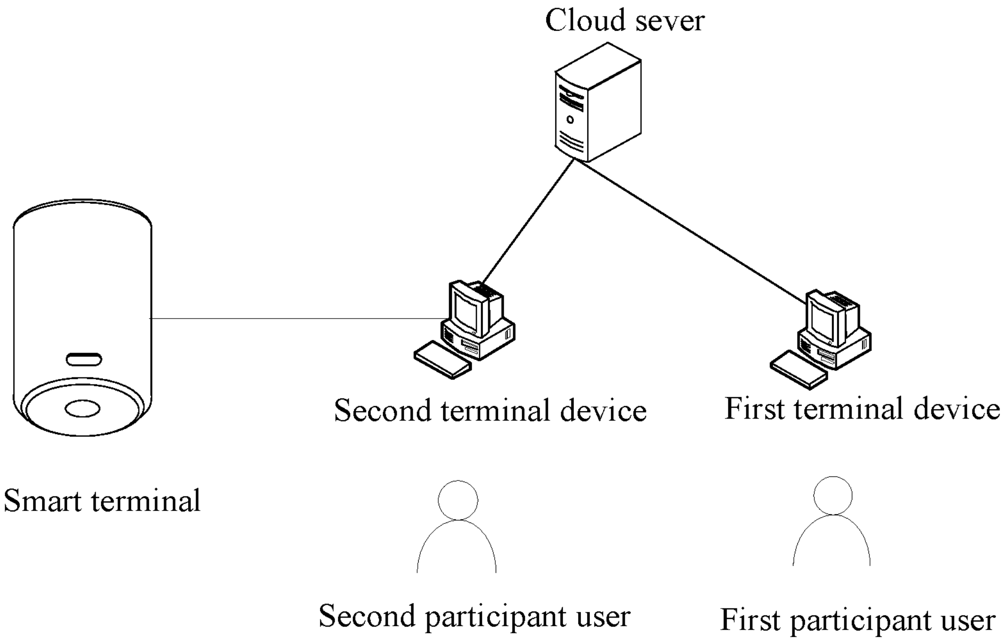
FIG. 4 is a schematic diagram of an application scenario of a voice processing method according to another embodiment of the present disclosure.
Figure 5:
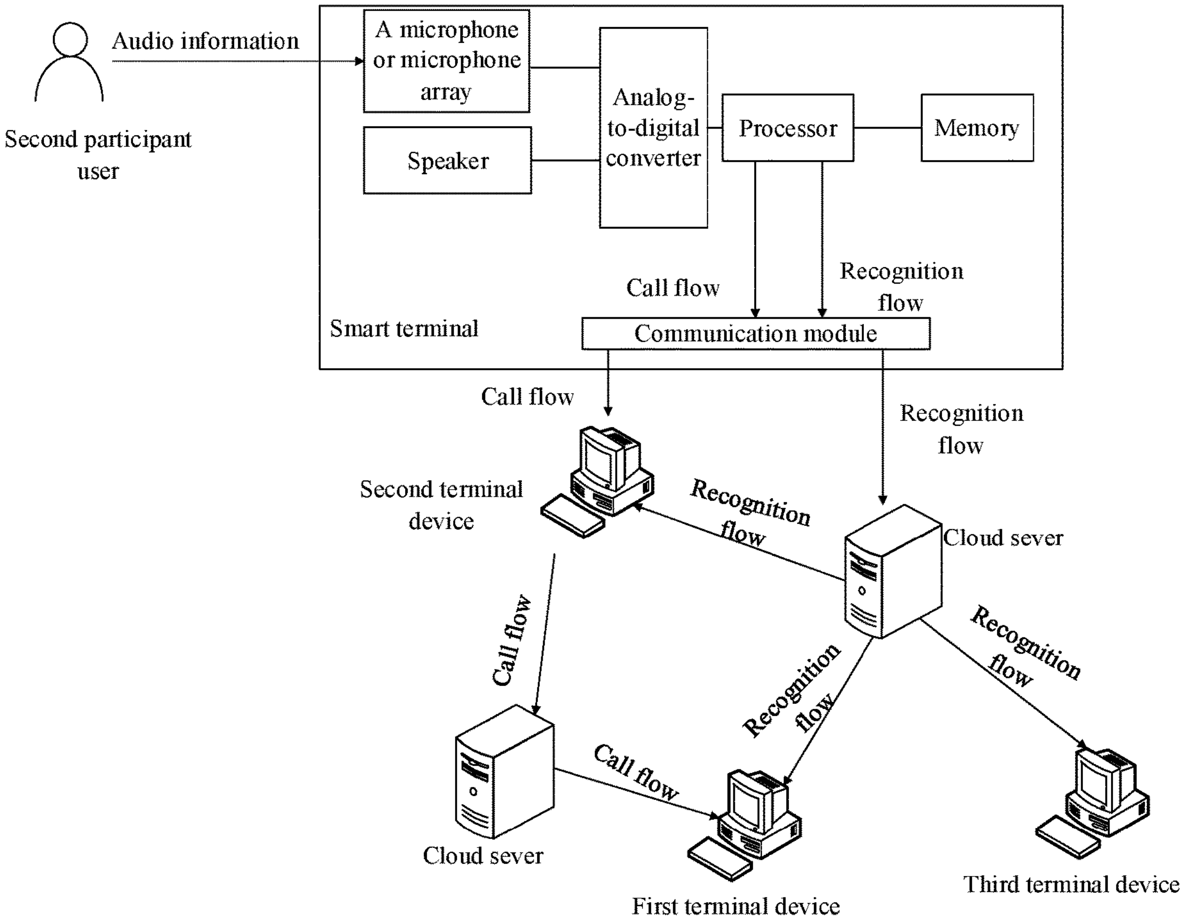
FIG. 5 is a schematic diagram of the principle of a voice processing method according to an embodiment of the present disclosure.

In order to make readers more deeply understand the technical solution of the present embodiment, and the difference between the technical solution of the present embodiment and the related technical solutions, etc., now in conjunction with FIG. 4 and FIG. 5, the voice processing method shown in FIG. 3 will be described in a more detailed way, where FIG. 4 is a schematic diagram of an application scenario of a voice processing method according to another embodiment of the present disclosure, and FIG. 5 is a schematic diagram of a principle of the voice processing method according to an embodiment of the present disclosure.

As shown in FIG. 4, the application scenario includes: a smart terminal, a first terminal device, a second terminal device, and a cloud server. The first terminal device is a device for a first participant user to conduct a remote conference with a second participant user, and the smart terminal and the second terminal device are devices for the second participant user to conduct a remote conference with the first participant user.

It is worth noting that, in the application scenario shown in FIG. 4, the smart terminal and the second terminal device are two independent devices. While in some other embodiments, the smart terminal may be integrated in the second terminal device, and the external presentation form of the smart terminal will not be limited in the present embodiment.

With reference to the application scenario as shown in FIG. 4, this step can be understood as: when the second participant user delivers a speech, the smart terminal device can collect corresponding audio information.

With reference to FIG. 5, in a possible implementation, a microphone or a microphone array may be set in the smart terminal, and the audio information is collected through the microphone or the microphone array.

It is worth noting that the number of microphones in the microphone array may be set based on requirements, historical records, experiments, etc. For example, the number of microphones is 6.

S202, converting a signal type of the audio information, where the signal type includes an analog signal and a digital signal, and the signal type of the audio information before converting is the analog signal, and the signal type of converted audio information is the digital signal.

With reference to FIG. 5, it can be seen that in a possible implementation, an analog-to-digital converter can be set in the smart terminal, the microphone array sends audio information of the analog signal collected to the analog-to-digital converter, and the analog-to-digital converter converts the audio information of the analog signal to audio information of the digital signal, so as to improve the efficiency and accuracy of subsequent processing on the audio information.

S203, performing echo cancellation processing on the converted audio information to obtain a residual signal.

Figure 6:
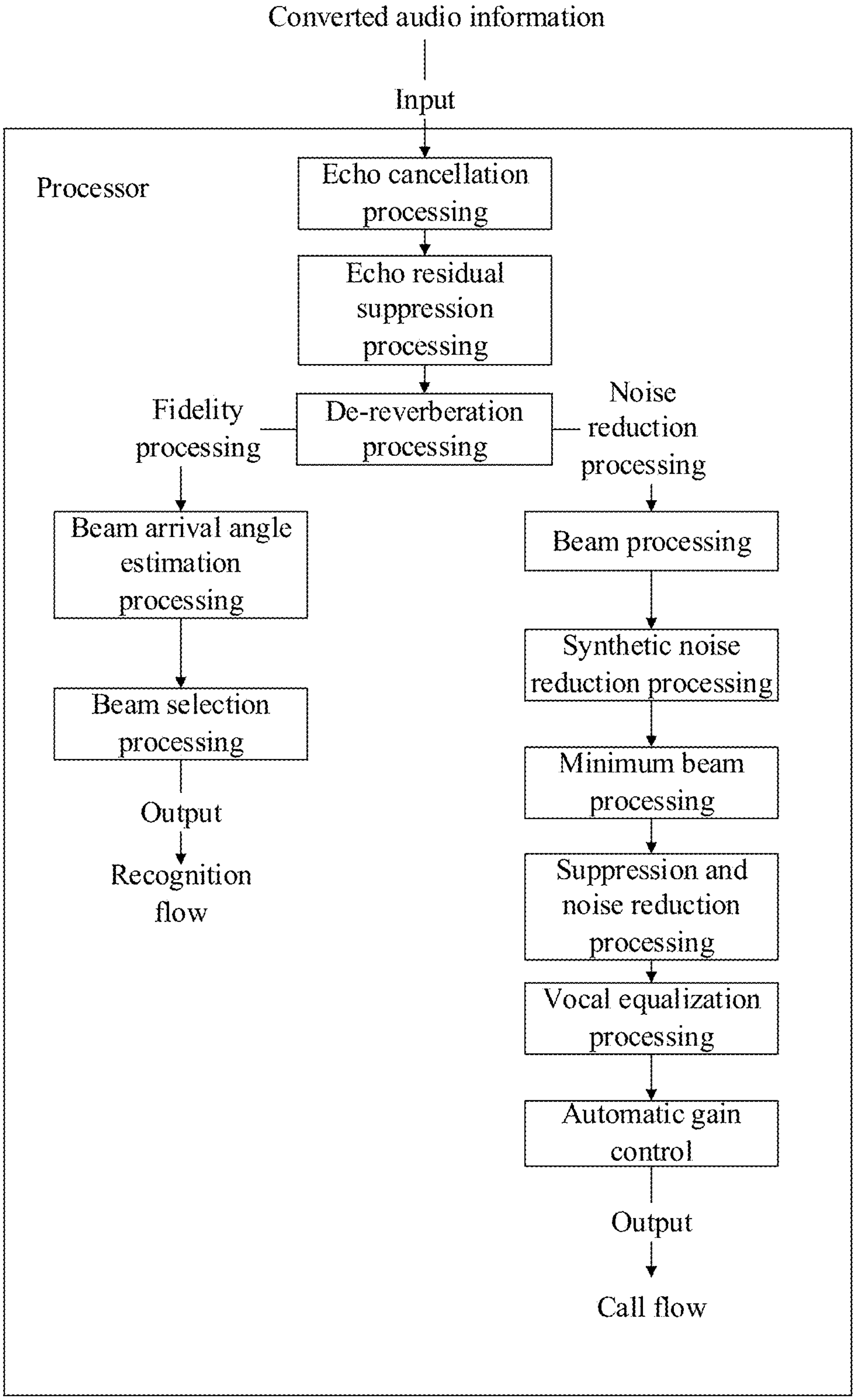
FIG. 6 is a principle diagram of the processor shown in FIG. 5.

With reference to FIG. 5 and FIG. 6, in a possible implementation, a processor may be set in the smart terminal, and the processor is connected to the analog-to-digital converter for receiving the converted audio information sent by the analog-to-digital converter, and the processor can perform echo cancellation processing on the converted audio information, where FIG. 6 is a principle diagram of the processor shown in FIG. 5.

In an example, the method of echo cancellation processing may include: determining an echo signal corresponding to the audio information, and performing cancellation processing on the echo signal according to a reference signal obtained to obtain a residual signal.

For example, an echo path corresponding to the audio information can be estimated according to the microphone array and a speaker of the smart terminal; according to the echo path and the reference signal obtained (such as the reference signal obtained from a power amplifier in the speaker), the echo signal received by the microphone array is estimated; a difference value between the reference signal and the echo signal is calculated, the difference value is the residual signal, and the residual signal is an echo-cancelled signal.

In another example, the method of echo cancellation processing may further include: setting an adaptive filter in the processor, and the adaptive filter may estimate an approximate echo path to approximate a real echo path, thereby obtaining an estimated echo signal; and removing the echo signal from a mixed signal composed of a pure voice and an echo to realize the echo cancellation, and the adaptive filter may specifically be a finite impulse response (Finite Impulse Response, FIR) filter.

S204, performing echo residual suppression processing on the residual signal to obtain a residual echo suppressed signal.

In some embodiments, the echo residual suppression processing method may include: performing Fourier transform on the residual signal to obtain a frequency domain signal, determining a frequency domain adjustment parameter corresponding to the frequency domain signal, adjusting the frequency domain signal according to the frequency domain adjustment parameter, and performing inverse Fourier transform on the adjusted frequency domain signal to obtain a residual echo suppressed signal.

For example, a deep learning neural network can be preset in the processor, the processor performs the Fourier transform on the residual signal to obtain the frequency domain signal; the frequency domain signal is sent to the deep learning neural network, and the deep learning neural network outputs a mask code in the frequency domain (the mask code indicating a probability of background noise in the frequency domain); the frequency domain signal is multiplied by the mask code to obtain a processed frequency domain signal; the inverse Fourier transform is performed on the processed frequency domain signal to obtain the residual echo suppressed signal.

S205, performing de-reverberation processing on the residual echo suppressed signal to obtain a de-reverberated signal.

In an example, the method of de-reverberation processing may include: constructing a multichannel linear prediction (Multichannel Linear Prediction, MCLP) model which characterizes that the residual echo suppressed signal is a linear combination of a current signal (i.e., the residual echo suppressed signal) and several previous frames of signals. The several previous frames of signals are convolved based on the multichannel linear prediction model, and a signal of a reverberation part in the current signal can be obtained. The signal of the reverberation part is subtracted from the current signal, and the de-reverberated signal can be obtained.

In another example, the method of de-reverberation processing may further include: determining a frequency cepstrum coefficient (Mel Frequency Cepstrum Coefficient, MFCC) corresponding to each microphone in the microphone array, and determining a frequency cepstrum coefficient difference between adjacent microphones, and constructing the de-reverberated signal based on the frequency cepstrum coefficient difference.

S206, processing the de-reverberated signal according to different processing methods to obtain a call flow and a recognition flow.

In some embodiments, S206 may include: performing clarity enhancement processing on the de-reverberated signal to obtain a call flow; and performing fidelity processing on the de-reverberated signal to obtain a recognition flow.

It is worth noting that, in the schematic diagram as shown in FIG. 5, the processor may include a preprocessor, a clarity enhancement processor, and a fidelity processor, where the preprocessor is a preprocessor configured to perform echo cancellation processing, echo residual suppression processing and de-reverberation processing, the clarity enhancement processor is configured to perform the clarity enhancement processing on the signal processed by the preprocessor, and the fidelity processor is configured to perform the fidelity processing on the signal processed by the preprocessor.

Illustratively, the description of the clarity enhancement processing is as follows.

In an example, the clarity enhancement processing may include: basic spectral subtraction, where the basic spectral subtraction can be understood as: presetting a basic frequency domain, and removing the de-reverberated signal outside the basic frequency domain.

In another example, the noise reduction processing may include: Wiener filter noise reduction, where the Wiener filter noise reduction can be understood as: training a filter based on a preset mean square error, and filtering the de-reverberated signal based on the filter, so that an error between a filtered de-reverberated signal and a pure de-reverberated signal is less than a preset error threshold.

With reference to FIG. 6, in still another example, the clarity enhancement processing may include: performing beam processing, synthetic noise reduction processing, minimum beam processing, suppression and noise reduction processing, vocal equalization processing, and automatic gain control on the de-reverberated signal in sequence, to obtain the call flow.

Illustratively, the method of beam processing may include: determining a plurality of sets of beam signals corresponding to the de-reverberated signal.

For example, a generalized sidelobe canceller (General sidelobe canceller, GSC) model is established, the de-reverberated signal is input into the generalized sidelobe canceler model, and the plurality of sets of beam signals in a horizontal space are output.

Illustratively, the method of synthetic noise reduction processing may include: determining an expected estimate of the de-reverberated signal (i.e., the pure signal of the audio information) according to the plurality of sets of beam signals; and performing phase synthesis on the expected estimate of the de-reverberated signal and the plurality of sets of beams to obtain a de-noised beam signal.

For example, an amplitude spectrum of the de-reverberated signal is modeled, and an amplitude spectrum of voice and noise obtained after modeling conforms to a Gaussian distribution; a steady-state noise of the conference is obtained; a posterior signal-to-noise ratio of the de-reverberated signal is estimated; according to the Bayesian principle and the posterior signal-to-noise ratio, the expected estimate of the de-reverberated signal is obtained; and the phase synthesis is performed on the expected estimate of the de-reverberated signal and the plurality of sets of beams to obtain the de-noised beam signal.

Illustratively, the method of minimum beam processing may include: determining an energy ratio between a beam signal with a maximum energy and a beam signal with a minimum energy in the de-noised beam signal, and determining a normalized beam signal according to the energy ratio.

For example, the beam signal with the maximum energy in the de-noised beam signals is determined, and the beam signal with the minimum energy in the de-noised beam signals is determined; the energy ratio between the maximum energy and the minimum energy is calculated; and whether the energy ratio is greater than a preset ratio threshold is determined; if yes, accumulation processing is performed on the beam signal with the maximum energy in a normalized manner to obtain the normalized beam signal.

Illustratively, the method of suppression and noise reduction processing may include: determining a mask code of the normalized beam signal; suppressing non-stationary noise of the normalized beam signal according to the mask code of the normalized beam signal to obtain a suppressed beam signal.

For example, a recurrent neural network can be preset, the normalized beam signal is output to the recurrent neural network, and the recurrent neural network outputs the mask code of the normalized beam signal, and the mask code of the normalized beam signal (the mask code indicating a probability of the non-stationary noise being the background noise) is multiplied by the non-stationary noise to obtain the suppressed beam signal.

Illustratively, the method of vocal equalization processing may include: compensating the suppressed beam signal in a preset frequency band to obtain a compensated beam signal.

For example, a segmented peak filter can be preset, and the suppressed beam signal output after the noise reduction is compensated in a preset frequency band (it can be set based on requirements, historical records, experiments, etc., which is not limited in the present embodiment) to obtain the compensated beam signal, so that sound quality of the hearing sense corresponding to the compensated beam signal is higher.

In an example, the method of automatic gain control may include: performing a Fourier transform on the compensated beam signal to obtain a power spectrum; inputting the power spectrum into a preset convolutional neural network to obtain a voice existence probability of a current frame; if the voice existence probability based on the current frame is greater than a preset probability threshold, determining that the voice of the current frame exists; and applying a gradually increasing gain to the compensated beam signal until the gain of the compensated beam signal is stable, and the call flow is obtained.

In another example, the method of automatic gain control may include the following steps.

Step 1, determining a gain weight according to the compensated beam signal and a preset equal loudness curve.

The equal loudness curve can be used to characterize a curve corresponding to the compensated beam signal with relatively high user satisfaction, which is determined based on experiments or other manners.

In this step, the compensated beam signal may be specifically mapped to the equal loudness curve, and the gain weight may be determined based on the difference therebetween.

Step 2, performing enhancement processing on the compensated beam signal according to the gain weight.

Illustratively, the description of the fidelity processing is as follows:

In an example, the method of fidelity processing may include: performing voiceprint recognition processing on the de-reverberated signal.

For example, the smart terminal performs feature extraction processing on the de-reverberated signal to obtain features, such as sound pitch, sound intensity, sound length, and sound timbre, of the de-reverberated signal, and restores the de-reverberated signal based on the features of sound pitch, sound intensity, sound length, sound timbre, etc. to obtain the recognition flow, so that the recognition flow has the characteristic of lower distortion.

With reference to FIG. 6, in another example, the method of fidelity processing may include: performing beam arrival angle estimation processing and beam selection processing on the de-reverberated signal.

Illustratively, the method of beam arrival angle estimation processing may include: performing multiple signal classification processing on the de-reverberated signal to obtain a directional spectrum; and determining a sound source direction corresponding to the de-reverberated signal according to the directional spectrum.

For example, the multiple signal classification processing is performed on the de-reverberated signal to obtain a frequency and time directional spectrum of the de-reverberated signal; a histogram corresponding to the directional spectrum can be constructed according to the frequency and time; and the sound source direction of the de-reverberated signal can be determined based on the histogram.

Illustratively, the method of beam selection processing may include: determining a start point, an end point and a controllable power response of the de-reverberated signal according to the sound source direction; and selecting the recognition flow from the de-reverberated signal according to the start point, the end point and the controllable power response.

It is worth noting that when utilizing the above methods to process audio information to obtain the call flow and the recognition flow, the audio information may be processed by just utilizing part of the methods, and the order of the methods for processing the audio information may be adjusted accordingly.

For example, when performing clarity enhancement processing on the audio information, it is possible to adopt only noise reduction processing and automatic gain processing; for another example, when performing fidelity processing on the audio information, it is possible to adopt only the beam selection processing; for still another example, when performing clarity enhancement processing on the audio information by adopting the methods shown in FIG. 6, the order of the processing methods can be adjusted optionally, for example, the suppression and noise reduction processing is performed first, and then the minimum beam processing is performed, and so on.

S207, sending the call flow and the recognition flow.

With reference to the application scenario shown in FIG. 4 and the schematic diagram shown in FIG. 5, it can be seen that in an example, the smart terminal can send the call flow to the cloud server through a communication module; accordingly, the cloud server can send the call flow to the first terminal device; accordingly, the first terminal device can perform voice broadcast based on the call flow; the smart terminal can send the recognition flow to the cloud server, accordingly, the cloud server can send the recognition flow to the first terminal device, and accordingly, the first terminal device can display text based on the recognition flow.

The cloud server may also perform the voice recognition based on the recognition flow to obtain a recognition result (that is, a transcribed text), and send the recognition flow and/or the transcribed text to the first terminal device; and the first terminal device may perform text display of the transcribed text, and of course, the recognition flow and/or the transcribed text may also be stored by the cloud server.

As shown in FIG. 5, in some embodiments, the cloud server may also send the recognition flow and/or the transcribed text to a second terminal device, and accordingly, the second terminal device may perform the text display of the transcribed text.

As shown in FIG. 5, in some embodiments, the cloud server may also send the recognition flow and/or the transcribed text to a third terminal device, and correspondingly, the third terminal device may perform text display of the transcribed text. Taking the application scenario shown in FIG. 4 as an example, the third terminal device may be a terminal device not in the remote conference. That is to say, the third terminal device is a device that can have a display function and can display the transcribed text, and the number of the third terminal devices is not limited in the present embodiment.

In another example, the smart terminal can send the call flow to the second terminal device through the communication module, and software for conducting the conference is running on the second terminal device. Accordingly, the second terminal device can send the call flow to the first terminal device based on the software for conducting the conference, and correspondingly, the first terminal device may perform the voice broadcast based on the call flow; for the principle of sending the recognition flow by the smart terminal, reference may be made to the above examples, which will not be repeated here.

In another example, a server can be additionally configured in the application scenario shown in FIG. 4, and the configuration of the second terminal device in FIG. 4 can be deleted. The smart terminal can send the call flow to the added server; correspondingly, the added server can send the call flow to the first terminal device; correspondingly, the first terminal device can perform the voice broadcast based on the call flow; as described in the above examples, the smart terminal can send the recognition flow to the cloud server, correspondingly, the cloud server can send the recognition flow to the first terminal device, and correspondingly, the first terminal device may perform the text display based on the recognition flow.

Similarly, the voice recognition may also be performed by the cloud server based on the recognition flow to obtain the recognition result (that is, the transcribed text), and the cloud server may send the recognition flow and/or the transcribed text to the first terminal device, and the first terminal device may perform text display of the transcribed text, and of course, the recognition flow and/or the transcribed text may also be stored by the cloud server.

In another example, the configuration of the cloud server in FIG. 4 may be deleted. For example, the smart terminal may send the call flow and recognition flow to the second terminal device, correspondingly, the second terminal device may send the call flow and recognition flow to the first terminal device, correspondingly, the first terminal device may perform the voice broadcast based on the call flow, determine the transcribed text based on the recognition flow, and perform the text display based on the transcribed text.

In still another example, the configuration of the second terminal device in FIG. 4 may be deleted. For example, the smart terminal may send the call flow and the recognition flow to the cloud server, correspondingly, the cloud server may send the call flow and the recognition flow to the first terminal device, correspondingly, the first terminal device may perform the voice broadcast based on the call flow, determine the transcribed text based on the recognition flow, and perform the text display based on the transcribed text.

In yet another example, the smart terminal may send the recognition flow to the second terminal device, accordingly, the second terminal device may send the recognition flow to the first terminal device, and accordingly, the first terminal device may determine the transcribed text based on the recognition flow, and perform text display based on the transcribed text; the smart terminal may send the call flow to the cloud server, accordingly, the cloud server may send the call flow to the first terminal device, and correspondingly, the first terminal device may perform the voice broadcast based on the call flow.

In another example, the smart terminal may send the call flow and the recognition flow to the second terminal device, correspondingly, the second terminal device may send the call flow and the recognition flow to the cloud server, and correspondingly, the cloud server may send the call flow and the recognition flow to the first terminal device, correspondingly, the first terminal device may perform the voice broadcast based on the call flow, determine the transcribed text based on the recognition flow, and perform the text display based on the transcribed text.

In some embodiments, the communication module may include a universal serial bus (Universal Serial Bus, USB) interface, wireless fidelity (Wireless Fidelity, Wi-Fi) and Bluetooth.

Illustratively, the smart terminal can be connected to the second terminal device based on any one of the universal serial bus interface, Wi-Fi and Bluetooth; the smart terminal can be connected to the cloud server based on Wi-Fi; and the second terminal device can be connected to the cloud server based on wireless fidelity.

S208, performing encoding and compressing processing on the recognition flow, and storing the processed recognition flow.

With reference to the schematic diagram shown in FIG. 5, a memory can be set in the smart terminal, and the memory can be connected to the processor. In an example, the memory can receive the recognition flow sent by the processor, and sequentially encode, compress, and storage the recognition flow; in another example, the memory may receive the recognition flow encoded and compressed by the processor, and store the received processed recognition flow.

It is worth noting that, in the present embodiment, by storing processed recognition flow, the problems of high cost and low reliability caused by manual recording by a conference recorder can be avoided, so that the speech content in the conference can be automatically recorded, and it is convenient for follow-up query and traceability, which improves the intelligence of the conference and improves the conference experience of the participants.

It should be understood that a conference is a process in which the participants communicate with each other. Therefore, in some embodiments, the smart terminal can receive a call flow sent by the first terminal device, or a call flow and a recognition flow, and when the smart terminal receives the call flow sent by the first terminal device, the voice broadcast can be performed based on the call flow, and when the smart terminal receives the recognition flow sent by the first terminal device, the text display can also be performed based on the recognition flow.

For example, with reference to the application scenarios shown in FIG. 4 and the diagram of the principle shown in FIG. 5, the first participant user in the conference can deliver a speech by means of the first terminal device, and the first terminal device can collect corresponding audio information, and can generate a call flow, and correspondingly, a speaker can be set in the smart terminal, and the smart terminal can perform voice broadcast of the call flow through the speaker.

In some other embodiments, the first terminal device may also generate the call flow and the recognition flow based on the above methods, and send both the call flow and the recognition flow to the second terminal device. The second terminal device may send the call flow to the smart terminal, so that the voice broadcast is performed by the smart terminal, and text display is performed by the second terminal device based on the recognition flow.

In some embodiments, the smart terminal can directly interact with the first terminal device without intermediate forwarding by the second terminal device, and a display can also be provided in the smart terminal. On the one hand, the smart terminal can perform the voice broadcast through the speaker, and on the other hand, the smart terminal can perform the text display through the display.

Illustratively, the display may be used to represent a device that displays text, such as a liquid crystal display (Liquid Crystal Display, LCD), a light emitting diode (Light Emitting Diode, LED) display, and an organic light emitting display (Organic Light Emitting Display, OLED), etc., which are not limited in the embodiments of the present application.

According to another aspect of the embodiments of the present disclosure, an embodiment of the present disclosure further provides a smart terminal.

With reference to FIG. 5, the smart terminal may include: a microphone array, a processor and a communication module;

the microphone array is configured to collect audio information in a conference process;

the processor is configured to generate a call flow and a recognition flow respectively according to the audio information, where the call flow is used for voice call, and the recognition flow is used for voice recognition; and the communication module is configured to send the call flow and the recognition flow.

In some embodiments, the processor is configured to process the audio information according to different processing methods to obtain the call flow and the recognition flow.

In some embodiments, the processor is configured to perform clarity enhancement processing on the audio information to obtain the call flow; and perform fidelity processing on the audio information to obtain the recognition flow.

In some embodiments, the processor is configured to perform noise reduction processing and automatic gain control on the audio information to obtain the call flow.

In some embodiments, the processor is configured to perform beam selection processing on the audio information to obtain the recognition flow.

In some embodiments, the processor is configured to perform echo cancellation processing on the audio information.

With reference to FIG. 5, it can be known that in some embodiments, the smart terminal further includes:

a speaker, configured to perform voice broadcast of the call flow sent by a first terminal device participating in the conference.

With reference to FIG. 5, it can be known that in some embodiments, the smart terminal further includes:

an analog-to-digital converter, configured to convert a signal type of the audio information to obtain converted audio information, where the signal type of the converted audio information is a digital signal.

In some embodiments, the processor is configured to perform echo cancellation processing on the converted audio information.

With reference to FIG. 5, it can be known that in some embodiments, the smart terminal further includes:

a memory, configured to store the recognition flow.

In some embodiments, the processor is configured to perform encoding processing and compression processing on the recognition flow; and the memory is configured to store the processed recognition flow.

In some embodiments, the communication module includes any one of Universal Serial Bus Interface, Wi-Fi, and Bluetooth.

According to another aspect of the embodiments of the present disclosure, an embodiment of the present disclosure further provides a voice processing apparatus.

Figure 7:
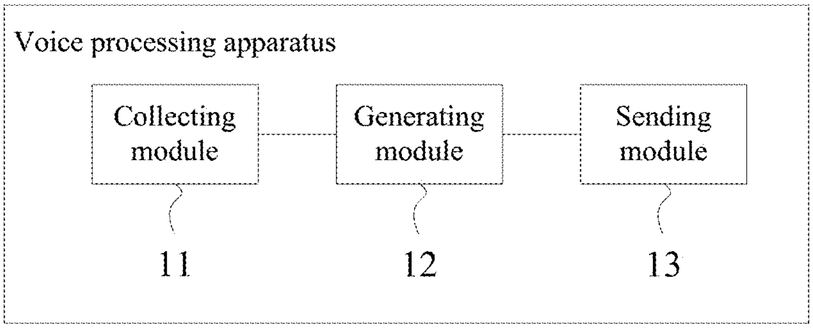
FIG. 7 is a schematic diagram of a voice processing apparatus according to an embodiment of the present disclosure.

Please refer to FIG. 7, which is a schematic diagram of a voice processing apparatus according to an embodiment of the present disclosure.

As shown in FIG. 7, the apparatus includes:

a collecting module 11, configured to collect audio information in a conference process;

a generating module 12, configured to generate a call flow and a recognition flow respectively according to the audio information, where the call flow is used for voice call, and the recognition flow is used for voice recognition; and a sending module 13, configured to send the call flow and the recognition flow.

In some embodiments, the generating module 12 is configured to process the audio information according to different processing methods to obtain the call flow and the recognition flow.

In some embodiments, the generating module 12 is configured to perform clarity enhancement processing on the audio information to obtain the call flow; and perform fidelity processing on the audio information to obtain the recognition flow.

In some embodiments, the generating module 12 is configured to perform noise reduction processing and automatic gain control on the audio information to obtain the call flow.

In some embodiments, the generating module 12 is configured to perform beam selection processing on the audio information to obtain the recognition flow.

In some embodiments, the generating module 12 is configured to perform echo cancellation processing on the audio information.

Figure 8:
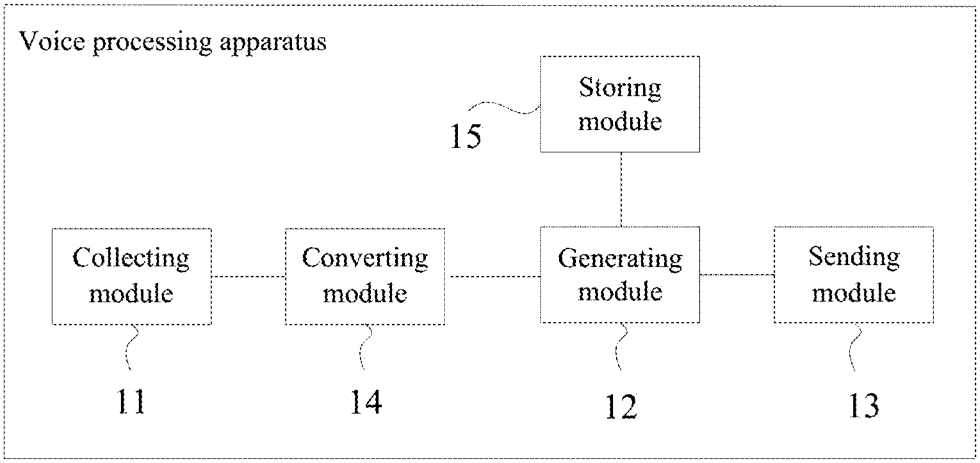
FIG. 8 is a schematic diagram of a voice processing apparatus according to another embodiment of the present disclosure.

With reference to FIG. 8, it can be known that in some embodiments, a signal type of the audio information is an analog signal; the apparatus further includes: a converting module 14, configured to convert a signal type of the audio information to obtain converted audio information, where the signal type of the converted audio information is a digital signal.

With reference to FIG. 8, it can be known that in some embodiments, the apparatus further includes: a storing module 15, configured to store the recognition flow.

In some embodiments, the storing module 15 is configured to perform encoding processing and compression processing on the recognition flow, and store the processed recognition flow.

According to another aspect of the embodiments of the present disclosure, the embodiments of the present disclosure further provide an electronic device and a storage medium.

Figure 9:
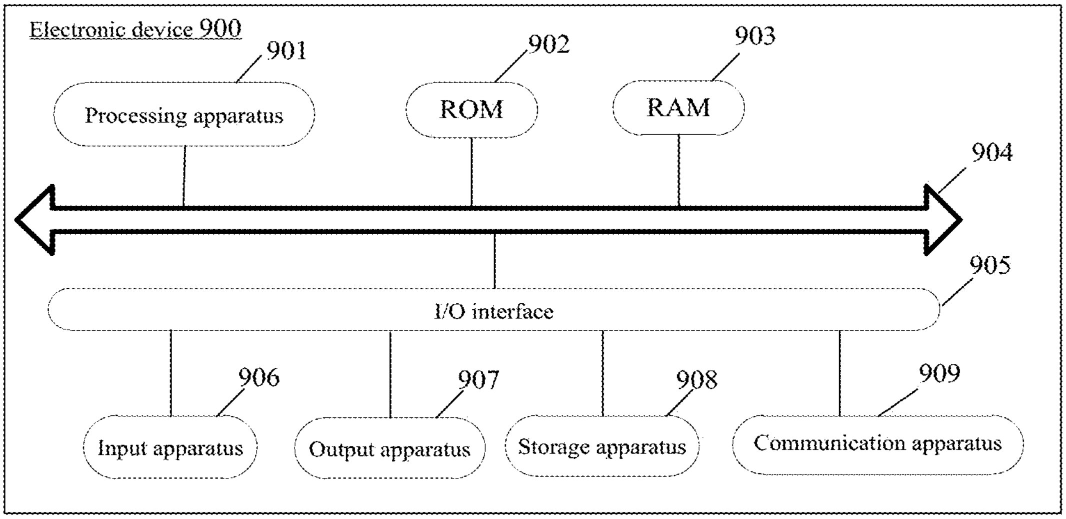
FIG. 9 is a schematic structural diagram of hardware of an electronic device according to an embodiment of the present disclosure.

Referring to FIG. 9, it shows a schematic structural diagram of an electronic device 900 suitable for implementing an embodiment of the present disclosure. The electronic device 900 may be a terminal device or a server. The terminal device may include, but is not limited to, a mobile terminal, such as a smart speaker, a mobile phone, a notebook computer, a digital broadcast receiver, a personal digital assistant (Personal Digital Assistant, PDA), a tablet computer (Portable Android Device, PAD), a portable multimedia player (Portable Media Player, PMP), and an in-vehicle terminal (for example, an in-vehicle navigation terminal), and a fixed terminal, such as a digital TV (Television) and a desktop computer. The electronic device shown in FIG. 9 is only an example, and should not impose any limitation on the function and scope of use of the embodiments of the present disclosure.

As shown in FIG. 9, the electronic device 900 may include a processing apparatus (such as a central processing unit, a graphics processor, etc.) 901, which may execute various appropriate actions and processing according to a program stored in a read-only memory (Read Only Memory, ROM) 902 or a program loaded from a storage apparatus 908 into a random access memory (Random Access Memory, RAM for short) 903. In the RAM 903, various programs and data necessary for the operation of the electronic device 900 are also stored. The processing apparatus 901, the ROM 902, and the RAM 903 are connected to each other through a bus 904. An input/output (I/O) interface 905 is also connected to the bus 904.

Generally, the following apparatus may be connected to the I/O interface 905: an input apparatus 906 including, for example, a touch screen, a touch pad, a keyboard, a mouse, a camera, a microphone, an accelerometer, a gyroscope, etc.; an output apparatus 907 including, for example, a liquid crystal display (Liquid Crystal Display, LCD), a speaker, a vibrator, etc.; a storage apparatus 908 including, for example, a magnetic tape, a hard disk, etc.; and a communication apparatus 909. The communication apparatus 909 may allow the electronic device to carry out wireless or wired communication with other device so as to exchange data. Although FIG. 9 shows an electronic device 900 having various apparatuses, it should be understood that not all of the illustrated apparatuses are required to be implemented or equipped. Alternatively, more or less apparatuses may be implemented or equipped.

In particular, according to embodiments of the present disclosure, the processes described above with reference to the flowcharts may be implemented as a computer software program. For example, an embodiment of the present disclosure includes a computer program product, which includes a computer program carried on a computer-readable medium, and the computer program includes program codes for executing the methods shown in the flowchart. In such an embodiment, the computer program may be downloaded from the network via the communication apparatus 909 and installed, or may be installed from the storage apparatus 908, or installed from the ROM 902. When the computer program is executed by the processing apparatus 901, the above-mentioned functions defined in the methods of the embodiments of the present disclosure are executed.

An embodiment of the present disclosure further provides a computer program, and when the computer program is executed by a processor, the voice processing method provided by any of the foregoing embodiments is executed.

It should be noted that the computer-readable medium mentioned above in the present disclosure may be a computer-readable signal medium or a computer-readable storage medium, or any combination of the above two. The computer readable storage medium may be, for example, but is not limited to, an electrical, magnetic, optical, electromagnetic, infrared, or semiconductor system, apparatus or device, or any combination of the above. More specific examples of the computer readable storage medium may include, but are not limited to, an electrical connection with one or more wires, a portable computer disk, a hard disk, a random access memory (RAM), a read only memory (ROM), an erasable programmable read only memory (Erasable Programmable Read Only Memory, EPROM or flash memory), an optical fiber, a portable compact disc read only memory (Compact Disc-ROM, CD-ROM), an optical storage device, a magnetic storage device, or any suitable combination of the above. In the present disclosure, a computer-readable storage medium may be any tangible medium that contains or stores a program, the program can be used by or in conjunction with an instruction execution system, apparatus, or device. And in the present disclosure, a computer-readable signal medium may include a data signal propagated in baseband or as part of a carrier wave, and carries computer-readable program codes. Such propagated data signals may take a variety of forms, including but not limited to an electromagnetic signal, an optical signal, or any suitable combination of the above. The computer-readable signal medium may also be any computer-readable medium other than a computer-readable storage medium and can transmit, propagate, or transport the program for use by or in conjunction with the instruction execution system, apparatus, or device. The program codes included on the computer readable medium may be transmitted using any suitable medium including, but not limited to, an electrical wire, an optical cable, radio frequency (Radio Frequency, RF), etc., or any suitable combination of the above.

The above-mentioned computer-readable medium may be included in the above-mentioned electronic device; it may also exist individually without being assembled into the electronic device.

The above-mentioned computer-readable medium carries one or more programs, and when the above-mentioned one or more programs are executed by the electronic device, the electronic device is caused to execute the methods shown in the above embodiments.

The computer program codes for carrying out operations of the present disclosure may be written in one or more programming languages or combination thereof, including object-oriented programming languages, such as Java, Smalltalk, C++, and conventional procedural programming languages, such as the "C" language or similar programming language. The program codes may be executed entirely on a user computer, partly on a user computer, as a stand-alone software package, partly on a user computer and partly on a remote computer, or entirely on a remote computer or a server. In the case of the remote computer, the remote computer can be connected to the user computer through any kind of network, including a local area network (Local Area Network, LAN) or a wide area network (Wide Area Network, WAN), or it can be connected to an external computer (for example, connected via the internet through an internet service provider).

The flowcharts and block diagrams in the accompanying drawings illustrate the architecture, functionality, and operation of possible implementations of systems, methods and computer program products according to various embodiments of the present disclosure. In this regard, each block in the flowcharts or block diagrams may represent a module, a program segment, or a part of code, and the module, the program segment, or the part of code contains one or more executable instructions for implementing a specified logical function. It should also be noted that, in some alternative implementations, the functions indicated in the blocks may occur in a different order than those indicated in the figures. For example, two blocks shown in succession may, in fact, be executed substantially concurrently, or may sometimes be executed in a reverse order, depending upon the function involved. It should also be noted that each block of the block diagrams and/or flowchart diagrams, and combinations of blocks in the block diagrams and/or flowchart diagrams, can be implemented by a dedicated hardware-based system for performing a specified function or operation, or can be implemented using a combination of dedicated hardware and computer instructions.

The units involved in the embodiments of the present disclosure may be implemented in a software manner, and may also be implemented in a hardware manner. The name of a unit does not constitute a limitation of the unit itself under certain circumstances. For example, a first obtaining unit may also be described as "a unit for obtaining at least two internet protocol addresses".

The functions described herein above may be performed, at least in part, by one or more hardware logic components. For example, without limitation, exemplary types of the hardware logic components that may be used include: field-programmable gate array (Field Programmable Gate Array, FPGA), application specific integrated circuit (Application Specific Integrated Circuit, ASIC), application specific standard product (Application Specific Standard Product, ASSP), system on chip (System on Chip, SOC), complex programmable logical device (Complex Programmable Logic Device, CPLD), etc.

In the context of the present disclosure, a machine-readable medium may be a tangible medium and may contain or store a program for use by or in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above.

The above descriptions are merely preferred embodiments of the present disclosure and illustrations of the technical principles employed. Those skilled in the art should understand that the scope of disclosure involved in the present disclosure is not limited to the technical solutions formed by specific combinations of the above-mentioned technical features, and should cover other technical solutions formed by any combination of the above-mentioned technical features or equivalent features thereof without departing from the above-mentioned disclosed concept. For example, a technical solution is formed by replacing the above features with the technical features having similar functions disclosed in the present disclosure (but not limited thereto).

Additionally, although operations are depicted in a particular order, this should not be construed as requiring that the operations are performed in the particular order shown or in a sequential order. Under certain circumstances, multitasking and parallel processing may be advantageous. Likewise, although the above description contains several specific implementation details, these should not be construed as limitations on the scope of the present disclosure. Certain features described in the context of separate embodiments may also be implemented in combination in a single embodiment. Conversely, various features described in the context of a single embodiment may also be implemented in multiple embodiments separately or in any suitable subcombination.

Although the subject matter has been described by language specific to structural features and/or method logical actions, it should be understood that the subject matter defined in the appended claims is not necessarily limited to specific features or actions described above. Rather, the specific features and actions described above are merely examples for implementing the claims.

What is claimed is:

1. A voice processing method, wherein the method is applied to an application scenario comprising a smart terminal, a first terminal device, and a cloud server, the first terminal device is a device for a first participant user to conduct a remote conference with a second participant user, the smart terminal is a device for the second participant user to conduct the remote conference with the first participant user, and the method comprises:

collecting, by the smart terminal, audio information for a speech delivered by the second participant user during a process of the conference;

generating, by the smart terminal, both a call flow and a recognition flow according to the audio information, wherein the call flow is used for playing a voice of the speech delivered by the second participant user, and the recognition flow is used for voice recognition of the speech delivered by the second participant user, wherein a transcribed text corresponding to the recognition flow is obtained by performing the voice recognition on the recognition flow; and sending, by the smart terminal, the call flow and the recognition flow;

wherein sending the call flow and the recognition flow comprises:

sending, by the smart terminal, the recognition flow to the cloud server, the recognition flow being sent to the first terminal device through the cloud server, so that the first terminal device performs the voice recognition to determine the transcribed text based on the recognition flow, and performs text display based on the transcribed text; and sending, by the smart terminal, the call flow to the cloud server, the call flow being sent to the first terminal device through the cloud server, so that the first terminal device plays the voice based on the call flow;

wherein the application scenario further comprises a second terminal device for the second participant user to conduct the remote conference with the first participant user, and a third terminal device not in the remote conference; and wherein the cloud server further sends the recognition flow to the third terminal device, so that the third terminal device performs the voice recognition to determine the transcribed text based on the recognition flow, and performs the text display based on the transcribed text.

2. The method according to claim 1, wherein generating both the call flow and the recognition flow according to the audio information comprises:

processing the audio information according to different processing methods to obtain the call flow and the recognition flow.

3. The method according to claim 2, wherein processing the audio information according to the different processing methods to obtain the call flow and the recognition flow comprises:

performing clarity enhancement processing on the audio information to obtain the call flow; and performing fidelity processing on the audio information to obtain the recognition flow.

4. The method according to claim 3, wherein performing the clarity enhancement processing on the audio information to obtain the call flow comprises:

performing noise reduction processing and automatic gain control on the audio information to obtain the call flow.

5. The method according to claim 3, wherein performing the fidelity processing on the audio information to obtain the recognition flow comprises:

performing beam selection processing on the audio information to obtain the recognition flow.

6. The method according to claim 3, before performing the clarity enhancement processing on the audio information to obtain the call flow, and performing the fidelity processing on the audio information to obtain the recognition flow, the method further comprises:

performing echo cancellation processing on the audio information.

7. A smart terminal, comprising: a microphone array, a processor and a communication module; wherein the smart terminal is applied to an application scenario comprising the smart terminal, a first terminal device, and a cloud server, the first terminal device is a device for a first participant user to conduct a remote conference with a second participant user, the smart terminal is a device for the second participant user to conduct the remote conference with the first participant user;

the microphone array is configured to collect audio information for a speech delivered by the second participant user during a process of the conference;

the processor is configured to generate both a call flow and a recognition flow according to the audio information, wherein the call flow is used for playing a voice of the speech delivered by the second participant user, and the recognition flow is used for voice recognition of the speech delivered by the second participant user, wherein a transcribed text corresponding to the recognition flow is obtained by performing the voice recognition on the recognition flow; and the communication module is configured to send the call flow and the recognition flow, and the communication module is specifically configured to:

send the recognition flow to the cloud server, the recognition flow being sent to the first terminal device through the cloud server, so that the first terminal device performs the voice recognition to determine the transcribed text based on the recognition flow, and performs text display based on the transcribed text; and send the call flow to the cloud server, the call flow being sent to the first terminal device through the cloud server, so that the first terminal device plays the voice based on the call flow;

wherein the application scenario further comprises a second terminal device for the second participant user to conduct the remote conference with the first participant user, and a third terminal device not in the remote conference; and wherein the cloud server further sends the recognition flow to the third terminal device, so that the third terminal device performs the voice recognition to determine the transcribed text based on the recognition flow, and performs the text display based on the transcribed text.

8. The smart terminal according to claim 7, wherein the processor is configured to process the audio information according to different processing methods to obtain the call flow and the recognition flow.

9. The smart terminal according to claim 8, wherein the processor is configured to perform clarity enhancement processing on the audio information to obtain the call flow; and perform fidelity processing on the audio information to obtain the recognition flow.

10. The smart terminal according to claim 9, wherein the processor is configured to perform noise reduction processing and automatic gain control on the audio information to obtain the call flow.

11. The smart terminal according to claim 9, wherein the processor is configured to perform beam selection processing on the audio information to obtain the recognition flow.

12. The smart terminal according to claim 9, wherein the processor is configured to perform echo cancellation processing on the audio information.

13. The smart terminal according to claim 7, further comprising:

a speaker, configured to play a voice based on a call flow sent by the first terminal device.

14. A voice processing apparatus, applied to a smart terminal, wherein the smart terminal is applied to an application scenario comprising the smart terminal, a first terminal device, and a cloud server, the first terminal device is a device for a first participant user to conduct a remote conference with a second participant user, the smart terminal is a device for the second participant user to conduct the remote conference with the first participant user, wherein the voice processing apparatus comprises: at least one processor and a memory; wherein the memory stores computer-executable instructions; and the at least one processor executes the computer-executable instructions stored in the memory to enable the smart terminal to:

collect audio information for a speech delivered by the second participant user during a process of the conference;

generate both a call flow and a recognition flow according to the audio information, wherein the call flow is used for playing a voice of the speech delivered by the second participant user, and the recognition flow is used for voice recognition of the speech delivered by the second participant user, wherein a transcribed text corresponding to the recognition flow is obtained by performing the voice recognition on the recognition flow; and send the call flow and the recognition flow;

wherein the smart terminal is specifically enabled to:

send the recognition flow to the cloud server, the recognition flow being sent to the first terminal device through the cloud server, so that the first terminal device performs the voice recognition to determine the transcribed text based on the recognition flow, and performs text display based on the transcribed text; and send the call flow to the cloud server, the call flow being sent to the first terminal device through the cloud server, so that the first terminal device plays the voice based on the call flow;

wherein the application scenario further comprises a second terminal device for the second participant user to conduct the remote conference with the first participant user, and a third terminal device not in the remote conference; and wherein the cloud server further sends the recognition flow to the third terminal device, so that the third terminal device performs the voice recognition to determine the transcribed text based on the recognition flow, and performs the text display based on the transcribed text.

15. A voice processing system, comprising:

the smart terminal according to claim 7, the first terminal device, the second terminal device, the third terminal device, and the cloud server.

16. An electronic device, comprising: at least one processor and a memory; wherein, the memory stores computer-executable instructions; and the at least one processor executes the computer-executable instructions stored in the memory to cause the at least one processor to execute the voice processing method according to claim 1.

17. A non-transitory computer-readable storage medium, wherein the computer-readable storage medium stores computer-executable instructions, wherein when the computer-executable instructions are executed by a processor, the voice processing method according to claim 1 is implemented.

18. A voice processing system, comprising:

the voice processing apparatus according to claim 14, the first terminal device, the second terminal device, the third terminal device, and the cloud server.

19. The voice processing apparatus according to claim 14, wherein the smart terminal is specifically enabled to:

process the audio information according to different processing methods to obtain the call flow and the recognition flow.

* * * * *